US009933861B2

(12) United States Patent
Wolfram et al.

(10) Patent No.: US 9,933,861 B2
(45) Date of Patent: Apr. 3, 2018

(54) METHOD AND APPARATUS FOR GENERATING A USER INTERFACE FOR TAKING OR VIEWING THE RESULTS OF PREDICTED ACTIONS

(75) Inventors: Stephen Wolfram, Champaign, IL (US); Kumar Mayank, Urbana, IL (US); Taliesin S. Beynon, Cambridge, MA (US)

(73) Assignee: Wolfram Research, Inc., Champaign, IL (US)

( * ) Notice: Subject to any disclaimer, the term of this patent is extended or adjusted under 35 U.S.C. 154(b) by 0 days.

(21) Appl. No.: 13/349,351

(22) Filed: Jan. 12, 2012

(65) Prior Publication Data
US 2013/0185663 A1    Jul. 18, 2013

(51) Int. Cl.
G06F 3/048 (2013.01)
G06F 3/023 (2006.01)
G06N 5/02 (2006.01)
G06F 3/0481 (2013.01)
G06F 17/10 (2006.01)

(52) U.S. Cl.
CPC .......... *G06F 3/0237* (2013.01); *G06F 3/0481* (2013.01); *G06F 17/10* (2013.01); *G06N 5/022* (2013.01)

(58) Field of Classification Search
CPC ........... G09G 5/14; G06F 9/4443; G06F 8/38; G06F 1/163; G06F 3/011; G06F 17/10; H04N 5/44591
USPC .................................................. 715/765, 810
See application file for complete search history.

(56) References Cited

U.S. PATENT DOCUMENTS

| | | | | |
|---|---|---|---|---|
| 5,535,422 A | * | 7/1996 | Chiang ................. | G06F 9/4446 434/118 |
| 6,400,996 B1 | * | 6/2002 | Hoffberg et al. ............... | 700/83 |
| 7,300,285 B2 | * | 11/2007 | Orr ......................... | G09B 7/02 434/118 |
| 7,707,487 B2 | * | 4/2010 | Easter ................ | G06F 17/2785 434/322 |

(Continued)

OTHER PUBLICATIONS

"Wolfram_Alpha Blog_Step-by-Step Math.pdf," Dec. 1, 2009, pp. 1-8, retrieved from the internet at http://web.archive.org/web/20160521181720/http://blog.wolframalpha.com/2009/12/01/step-by-step-math/ on Jan. 11, 2017.*

(Continued)

*Primary Examiner* — Joy M Weber
(74) *Attorney, Agent, or Firm* — Drinker Biddle & Reath LLP

(57) ABSTRACT

A result is generated, using a data processing or computational system, in response to a user-provided or user-indicated input expression. The result is displayed, or caused to be displayed, on a display device. The result is analyzed, and, based on the analysis of the result, one or more further data processing or computational actions that the user will perform on the result are predicted. A user interface mechanism is generated to facilitate performing the predicted one or more further data processing or computational actions or to facilitate viewing one or more further results generated in response to one or more of the predicted further data processing or computational actions. The user interface mechanism is displayed or caused to be displayed on the display device.

15 Claims, 10 Drawing Sheets

(56) References Cited

U.S. PATENT DOCUMENTS

| | | | |
|---|---|---|---|
| 2003/0088533 A1* | 5/2003 | Fortenberry | G06F 17/10 706/47 |
| 2007/0156747 A1* | 7/2007 | Samuelson | 707/102 |
| 2007/0209013 A1* | 9/2007 | Ramsey et al. | 715/769 |
| 2009/0228832 A1* | 9/2009 | Cheng | 715/810 |
| 2009/0234710 A1* | 9/2009 | Belgaied Hassine et al. | 705/10 |

OTHER PUBLICATIONS

"ShowSteps button—MathematicaAlpha.pdf," Nov. 1, 2010, pp. 1-2, retrieved from the internet at http://blog.wolframalpha.com/2010/11/01/yes-those-calculators-are-dynamic/ on Jan. 11, 2017.*

"TESS_MATHEMATICA.pdf", pp. 1-2, retrieved from the internet at http://tess2.uspto.gov/bin/showfield?f=doc&state=4806:rnnn9x.2.2 on Jan. 11, 2017.*

* cited by examiner

METHOD AND APPARATUS FOR GENERATING A USER INTERFACE FOR TAKING OR VIEWING THE RESULTS OF PREDICTED ACTIONS

FIELD OF THE DISCLOSURE

The present disclosure relates generally to user interfaces and, more particularly, to generation of user interfaces based on a prediction of a subsequent user action.

BACKGROUND

The MATHEMATICA® software system is a powerful computational tool that can evaluate general symbolic expressions, as well as mathematical and numeric expressions. A unifying feature of MATHEMATICA® is that everything is internally represented as a symbolic expression, with all more specific data types treated as special cases—symbols to which additional rules apply. MATHEMATICA® is an interpreted language, with a notion of "evaluation" of symbolic expressions. Evaluation involves applying to any symbolic expression all transformation rules that fit that expression.

In the MATHEMATICA® software system, a user can create interactive electronic documents referred to as "notebooks." Various expressions, including numeric and symbolic expressions, can be entered into a notebook via a keyboard, for example, and a user can cause the expression to be evaluated.

Various expressions, including numeric and symbolic expressions, can be entered into a notebook via a keyboard, for example, and a user can cause the expression to be evaluated. Some expressions may be used to create graphical displays in a notebook. One example is a built-in function Plot. A user could type into the notebook the expression "Plot[y^2, {y, 0, 5}]", and the MATHEMATICA® software system evaluates the expression "Plot [y^2, {y, 0, 5}]" to generate a plot of the function y2 versus the variable y between y=0 to y=5. The generated plot is then displayed in the notebook. The MATHEMATICA®software system provides other built-in functions for creating graphical displays such as ContourPlot, DensityPlot, Plot3D, ParametricPlot, ParametricPlot3D, etc. Further, built-in functions are provided for displaying tables and matrices.

Spreadsheet software applications, such as the EXCEL® software application available from Microsoft Corporation, permit a user to create spreadsheets comprising grids of cells. In a spreadsheet, a value in one cell may be dependent upon a value in one or more other cells. For example, a user may assign a formula to a first cell that uses a value from a second cell. Then, the spreadsheet application will calculate an output of the formula using the value from the second cell, and will display the calculated value in the first cell. When a user changes the value of the first cell, the spreadsheet application will recalculate the value of the formula of the second cell. Such applications require inputs to the first cell in a numeric form, need an explicit formula taking numeric input to relate the contents of the second cell to the numeric values in the first, and output numeric output to the second cell.

SUMMARY

In various disclosed embodiments, methods, apparatus, and computer readable memory provide for generation of user interface mechanisms based on predictions of subsequent user actions. In an embodiment, a result is generated, using a data processing or computational system, in response to a user-provided or user-indicated input expression. The result is displayed, or caused to be displayed, on a display device. The result is analyzed, and, based on the analysis of the result, one or more further data processing or computational actions that the user will perform on the result are predicted. A user interface mechanism is generated to facilitate performing the predicted one or more further data processing or computational actions or to facilitate viewing one or more further results generated in response to one or more of the predicted further data processing or computational actions. The user interface mechanism is displayed or caused to be displayed on the display device.

In other embodiments, one or more of the following features may be included. Predicting the one or more further data processing or computational actions that the user will perform on the result comprises generating a set of predicted actions, attempting to compute a corresponding result for each predicted action in the set, and determining the one or more further data processing or computational actions that the user will perform on the result based on respective results of the attempts to compute the corresponding result for set of predicted actions.

Predicting the one or more further data processing or computational actions that the user will perform on the result is based on historical data related to past further data processing or computational actions performed on the same or similar results.

The historical data includes data indicating past further data processing or computational actions that the user chose to perform on the same or similar results.

The historical data includes data indicating past further data processing or computational actions that at least one other user chose to perform on the same or similar results.

The historical data includes data indicating past user-provided or user-indicated input expressions related to data of a type the same as a type of the result.

A further result corresponding to one of the predicted further data processing or computational actions is generated, a visual indication of the further result is generated, and the user interface is generated to include the visual indication of the further result.

Analyzing the result comprises determining a type of the result from a plurality of different types, and predicting the one or more further data processing or computational actions that the user will perform on the result is based on the determined type of the result.

Analyzing the result comprises determining one or more characteristics of the result, and predicting the one or more further data processing or computational actions that the user will perform on the result is based on a combination of (i) the determined type of the result, and (ii) the determined one or more characteristics of the result.

DETAILED DESCRIPTION

Figure 1:
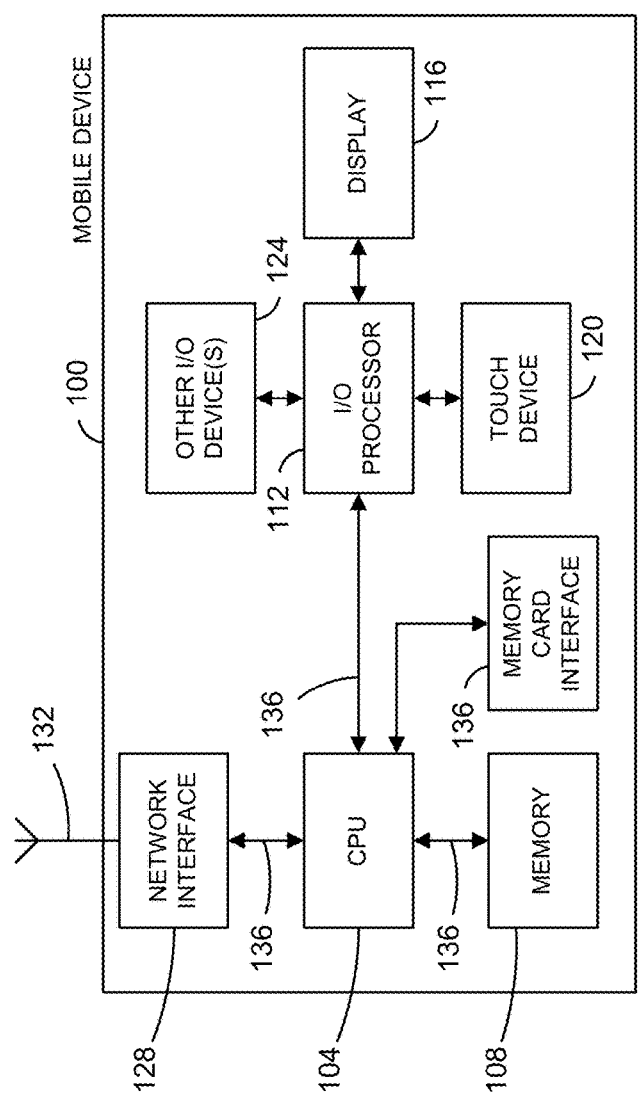
FIG. 1 a block diagram of an example computing device configured to implement user interface techniques described herein, in an embodiment.

FIG. 1 is a diagram of an example mobile computing device 100 which may implement a computational application that predicts actions a user may wish to take and provides a user interface mechanism to facilitate taking the predicted actions, according to an embodiment.

Examples of the computational application include a calculator application, a spreadsheet application, the MATHEMATICA® software system available from Wolfram Research, Inc., etc. The device 100 includes a central processing unit (CPU) 104 coupled to a memory 108 (which can include one or more computer readable storage media such as random access memory (RAM), read only memory (ROM), FLASH memory, a hard disk drive, a digital versatile disk (DVD) disk drive, a Blu-ray disk drive, etc.). The device also includes an input/output (I/O) processor 112 that interfaces the CPU 104 with a display device 116 and a touch-sensitive device or touchscreen 120 (e.g., a single-touch or multi-touch touchscreen). The I/O processor 112 also interfaces one or more additional I/O devices 124 to the CPU 104, such as one or more buttons, click wheels, a keyboard, a keypad, a touch pad, another touchscreen (single-touch or multi-touch), lights, a speaker, a microphone, etc.

A network interface 128 is coupled to the CPU 104 and to an antenna 132. A memory card interface 136 is coupled to the CPU 104. The memory card interface 136 is adapted to receive a memory card such as a secure digital (SD) card, a miniSD card, a microSD card, a Secure Digital High Capacity (SDHC) card, etc., or any suitable card.

The CPU 104, the memory 108, the I/O processor 112, the network interface 128, and the memory card interface 136 are coupled to one or more busses 136. For example, the CPU 104, the memory 108, the I/O processor 112, the network interface 128, and the memory card interface 136 are coupled to a single bus 136, in an embodiment. In another embodiment, the CPU 104 and the memory 108 are coupled to a first bus, and the CPU 104, the I/O processor 112, the network interface 128, and the memory card interface 136 are coupled to a second bus.

The device 100 is only one example of a mobile computing device 100, and other suitable devices can have more or fewer components than shown, can combine two or more components, or a can have a different configuration or arrangement of the components. The various components shown in FIG. 1 can be implemented in hardware, a processor executing software or firmware instructions or a combination of both hardware and a processor executing software or firmware instructions, including one or more signal processing and/or application specific integrated circuits.

The CPU 104 executes computer readable instructions stored in the memory 108. The I/O processor 112 interfaces the CPU 104 with input and/or output devices, such as the display 116, the touch screen 120, and other input/control devices 124. The I/O processor 112 can include a display controller (not shown) and a touchscreen controller (not shown). The touchscreen 120 includes one or more of a touch-sensitive surface and a sensor or set of sensors that accepts input from the user based on haptic and/or tactile contact. The touchscreen 120 utilizes one or more of currently known or later developed touch sensing technologies, including one or more of capacitive, resistive, infrared, and surface acoustic wave technologies, as well as other proximity sensor arrays or other elements for determining one or more points of contact with the touchscreen 120. The touchscreen 120 and the I/O processor 112 (along with any associated modules and/or sets of instructions stored in memory 102 and executed by the CPU 104) can detect one or more points of or instances of contact (and any movement or breaking of the contact(s)) on the touchscreen 120, in some embodiments. Such detected contact can be converted by the CPU 104 into interaction with a user-interface mechanism that is displayed on the display 116. A user can make contact with the touchscreen 120 using any suitable object or appendage, such as a stylus, a finger, etc.

The network interface 128 facilitates communication with a wireless communication network such as a wireless local area network (WLAN), a wide area network (WAN), a personal area network (PAN), etc., via the antenna 132. In other embodiments, one or more different and/or additional network interfaces facilitate wired communication with one or more of a local area network (LAN), a WAN, another computing device such as a personal computer, a server, etc.

Software components (i.e., sets of computer readable instructions executable by the CPU 104) are stored in the memory 108. The software components can include an operating system, a communication module, a contact module, a graphics module, and applications such as a computational application, a data processing application, etc. The operating system can include various software components and/or drivers for controlling and managing general system tasks (e.g., memory management, etc.) and can facilitate communication between various hardware and software components. The communication module can facilitate communication with other devices via the network interface 128.

The contact module can detect contact with the touchscreen 120 (in conjunction with the I/O processor 112). The contact module can include various software components for performing various operations related to detection of contact, such as determining if contact has occurred, determining if there is movement of the contact and tracking the movement across the touchscreen 120 (in some embodiments), and determining if the contact has been broken (i.e., if the contact has ceased). Determining movement of the point of contact can include determining speed (magnitude), velocity (magnitude and direction), and/or an acceleration (a change in magnitude and/or direction) of the point of contact. These operations can be applied to single contacts (e.g., one finger contacts) or to multiple simultaneous contacts (e.g., "multi-touch"/multiple finger contacts), in some embodiments.

The graphics module can include various suitable software components for rendering and displaying graphics objects on the display 116. As used herein, the term "graphics" includes any object that can be displayed to a user, including without limitation text, web pages, icons (such as user-interface objects including soft keys), digital images, etc.

In an embodiment, the computational application is configured to cause displays (e.g., windows) to be displayed on the display 116. As discussed below, the computational application may be configured to generate user interface mechanisms and cause the user interface mechanisms to be displayed on the display 116.

Each of the above identified modules and applications can correspond to a set of instructions that, when executed by a processor, cause one or more functions described above to be implemented. These modules need not be implemented as separate software programs, procedures or modules, and thus various subsets of these modules can be combined or otherwise re-arranged in various embodiments. In some embodiments, the memory 108 stores a subset of the modules and data structures identified above. In other embodiments, the memory 108 stores additional modules and data structures not described above.

In various examples and embodiments described below, displays and user interfaces are described with reference to the device 100 of FIG. 1 for ease of explanation. In other embodiments, another suitable device different than the device 100 is utilized to display displays and user interfaces. For example, other suitable devices include desktop computers, servers, etc.

Figure 2:
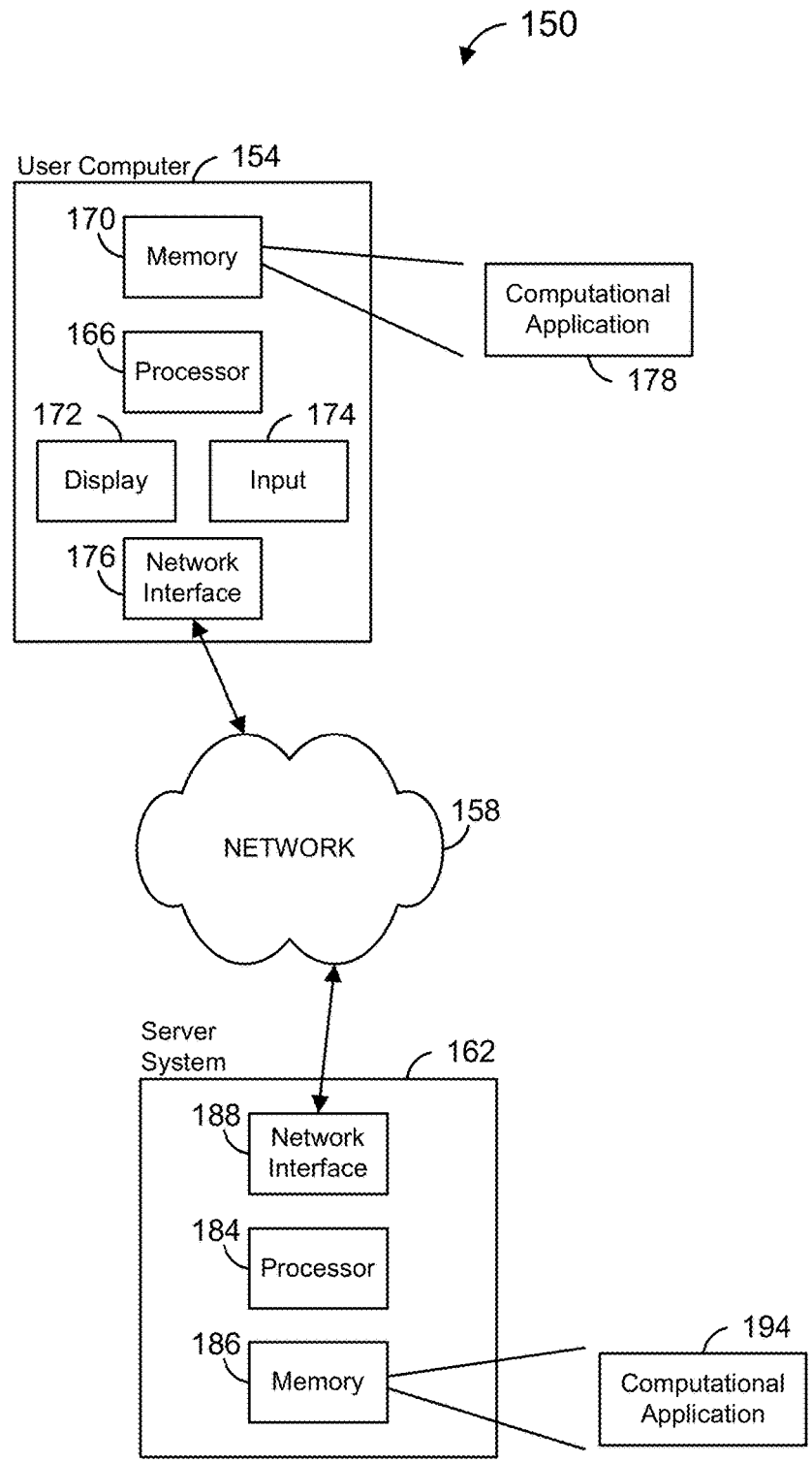
FIG. 2 a block diagram of an example system configured to implement user interface techniques described herein, in an embodiment.

FIG. 2 is a diagram of an example system 150 which implements a computational application that predicts actions a user may wish to take and provides a user interface mechanism to facilitate taking the predicted actions, according to another embodiment.

A user computer 154 is configured to implement a computational application alone or in conjunction with a server system 162. In embodiments that include the server system 162, the user computer 154 is communicatively coupled to a communication network 158 such as the Internet, an intranet, an extranet, etc., and the server system 162 is also communicatively coupled to the network 108. In embodiments that include the server system 162, the user computer 154 is configured to communicate with the server system 162 via the network 158. In particular, the user computer 154 may be configured to transmit electronically to the server system 162, via the network 158, user input that is indicative of one or more analyses or functions to be performed. The server system 162 may be configured to analyze the user input from the user computer 154 and to perform the one or more analyses or functions in response to the user input. The server system 162 may be configured to transmit electronically to the user computer 154, via the network 158, the results of the analyses.

The user computer 154 may be a computing device such as a desktop computer, a gaming system, a tablet computer, a smart phone, etc. The user computer 154 may include one or more processors 166, one or more memory devices 170 (e.g., random access memory (RAM), read only memory (ROM), FLASH memory, a magnetic disk, an optical disk, etc.), one or more display devices 172 (e.g., integral display device and/or external display device), and one or more input devices 174, such as a keyboard, a keypad, a button, a mouse, a trackball, a touch screen, a multi-touch screen, a touch pad, etc. The user computer 154 may include a network interface 176 to communicatively couple the user computer 154 to the network 158. At least some of the one or more processors 166, the one or more memory devices 170, the one or more display devices 172, the one or more input devices 174, and the network interface 176 may be communicatively coupled together via one or more busses (not shown), cords (not shown), etc.

The one or more memory devices 170 may store all or a portion of a computational application 178. The computational application 178, when executed by the one or more processors 166, may perform numerical, graphical, and/or symbolic calculations corresponding to functions, commands, instructions, etc., entered by the user in an electronic worksheet, spreadsheet, workbook, etc. For example, the computational application 178 may execute or interpret the entered functions, commands, instructions, etc., and perform corresponding numerical and/or symbolic calculations to generate corresponding results, which the computational application 178 may display in the electronic worksheet, spreadsheet, workbook, etc.

In embodiments in which the server system 162 is included, the computational application 178 may comprise a front end system that interfaces with a kernel implemented by the server system 162. In this embodiment, the front end system implemented by the user computer 154 may receive user input corresponding to functions commands, instructions, etc., and forward the user input to the server system 162. The kernel implemented on the server system 162 may then execute or interpret the entered functions, commands, instructions, etc., and perform corresponding numerical and/or symbolic calculations to generate corresponding results. The server system 162 may then transmit the results to the user computer 154, and the front end system implemented by the user computer 154 may then display the results in the electronic worksheet, spreadsheet, workbook, etc.

In embodiments in which the server system 162 is included, the user computer 154 need not implement the computational application 178. Rather, the server system 162 may implement a computational application, and a user may utilize the computational application by way of a web browser implemented by the user computer 154. In this embodiment, the user computer 154 may receive user input corresponding to functions commands, instructions, etc. entered by the user by way of a web page that corresponds to an electronic worksheet, a spreadsheet, a workbook, and forward the user input to the server system 162. The computational application implemented on the server system 162 may then execute or interpret the entered functions, commands, instructions, etc., and perform corresponding numerical and/or symbolic calculations to generate corresponding results. The server system 162 may then generate an updated electronic worksheet, spreadsheet, workbook, etc., that includes the results, and transmit the electronic worksheet, spreadsheet, workbook, etc., to the user computer 154 as a web page, for example. The web browser implemented by the user computer 154 may then display the updated electronic worksheet, spreadsheet, workbook, etc., that includes the results.

The server system 162 may comprise one or more computing devices such as a desktop computer, a server, a mainframe, etc. The server system 162 may include one or more processors 184, one more memory devices 186 (e.g., RAM, ROM, FLASH memory, a magnetic disk, an optical disk, a database system, etc.), and a network interface 188 to communicatively couple the server system 162 to the network 158. At least some of the one or more processors 184, the one or more memory devices 186, and the network interface 188 may be communicatively coupled together via one or more of 1) one or more busses, 2) one or more networks (e.g., a local area network (LAN), a wide area network (WAN), etc.) 3) point-to-point communication links, 4) cords, etc. (not shown).

The one or more memory devices 186 may store a computational application 194 or a portion of the computational application. The computational application 194, when executed by the one or more processors 194, may perform numerical, graphical, and/or symbolic calculations corresponding to functions, commands, instructions, etc., entered by the user in an electronic worksheet, spreadsheet, workbook, etc. For example, the computational application 194 may execute or interpret the functions, commands, instructions, etc., received from the user computer 154, and perform corresponding numerical and/or symbolic calculations to generate corresponding results. In embodiments in which the server system 162 implements a kernel of a computational application, the computational application 194 may cause the server system 162 to transmit the results to the user computer 154 via the network 158. In embodiments in which the server system implements a full computational application 194, which the computational application 194 may generate an updated electronic worksheet, spreadsheet, workbook, etc., that includes the results as a web page, for example, and may cause the server system 162 to transmit the web page to the user computer 154 via the network 158.

Additionally, the software development assistance system application 210, when executed by the one or more processors 194, may cause the determined instruction(s) in the precise syntax to be transmitted to the user computer 154 via the network 158.

Figure 3:
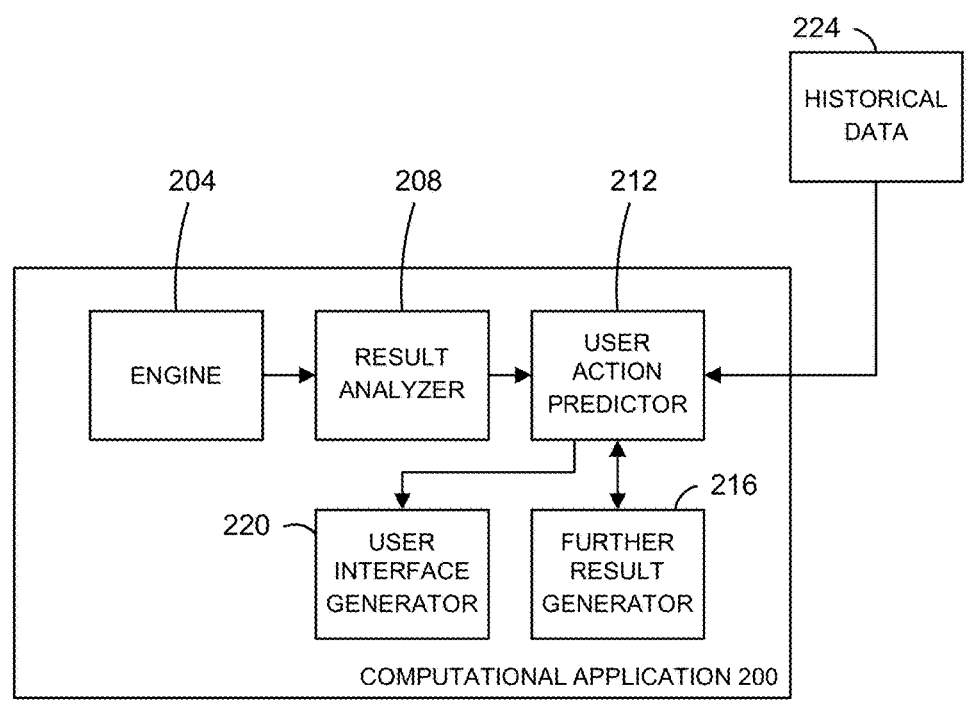
FIG. 3 is a block diagram of an example computational application configured to implement user interface techniques described herein, in an embodiment.

FIG. 3 is a block diagram of an example computational application 200, according to an embodiment. The computational application 200 may be implemented on the device 100, the user computer 154, and/or the server system 162, or another suitable device or devices. The computational application 200 may be configured to receive a user-provided or user-indicated numeric analysis expression or mathematical expression, and then evaluate the expression to generate a result. Examples of the computational application 200 include a calculator application, a spreadsheet application, a computational application similar to the MATHEMATICA® software system available from Wolfram Research, Inc., etc.

The computational application 200 includes a computational engine 204 to evaluate the numeric analysis expressions or mathematical expressions to generate results. The engine 204 may generate results in a plurality of types. For example, the engine 204 may be configured to generate two or more of the following types of results: one or more numeric values, a symbolic expression (e.g., "$3x^2+5x+1$"), a plot of a plurality of data points, a plot of a function, etc. The computational application 200 also includes a result analyzer 208 that is configured to analyze results generated by the engine 204 and to determine, based on the analysis of the result, the type of the result and/or other characteristics of the result. For example, the result analyzer 208 may determine that a result is a numeric value having certain units (e.g., units of time, units of distance, monetary units, etc.). As another example, the result analyzer 208 may determine that a result is a symbolic expression, and in particular a polynomial having a certain order. As another example, the result analyzer 208 may determine that a result is a plot with multiple axes having certain units associates with the axes (e.g., a plot of a temperature versus time).

Additionally, the computational application 200 includes a user action predictor 212 to generate predictions of actions that a user may want to take with regard to further processing or analysis of the results or based on the results generated by the engine 204. The user action predictor 212 is configured to generate the predictions based on the type information and/or characteristics regarding the results generated by the result analyzer 204. For example, when the result includes a plurality of numeric values, the user action predictor 212 may predict that the user may wish to plot the values, at least in some scenarios, whereas when the result includes a symbolic expression which is a polynomial, the user action predictor 212 may predict that the user may wish to factor the polynomial. As another example, when the result includes a numeric value in units of feet per second, the user action predictor 212 may predict that the user may wish to convert the value to units of miles per hour, at least in some scenarios, whereas when the result includes a monetary value in units of Canadian dollars, the user action predictor 212 may predict that the user may wish to convert the value to units of United States dollars. As another example, when the result includes a symbolic expression which is a third order polynomial, the user action predictor 212 may predict that the user may wish to factor the polynomial, whereas when the result includes a symbolic expression which is a 100-th order polynomial, the user action predictor 212 may predict that the user may wish to perform an operation more complex than factoring.

In an embodiment, the user action predictor 212 is configured to generate predictions of actions based on the type of a result generated by the engine 204. For example, the user action predictor 212 may generate different predictions when the result is a polynomial as compared to when the result is a trigonometric function. In an embodiment, the user action predictor 212 is configured to generate predictions of actions based on characteristics of a result generated by the engine 204. Characteristics of a result may include one or more of units of the result, a magnitude of the result, an order of a polynomial, whether the result includes complex components (e.g., imaginary number components), a number of elements of the result (e.g., if the result is a list or set of elements, a characteristic may be the number of elements in list or set), etc. For example, the user action predictor 212 may generate different predictions when the result has units of currency as compared to when the result has units of length. As another example, the user action predictor 212 may generate different predictions when the result is a polynomial of order three as compared to when the result is a polynomial of order 100. As another example, the user action predictor 212 may generate different predictions when the result includes only real numbers or real valued coefficients as compared to when the result includes complex numbers or complex valued coefficients. In an embodiment, the user action predictor 212 is configured to generate predictions of actions based on the type of a result generated by the engine 204 as well as characteristics of the result.

The computational application 200 also includes a further result generator 216 to generate, or attempt to generate, further results corresponding to the actions predicted by the user action predictor 212. For instance, when the user action predictor 212 predicts that the user may wish to perform a further operation on a result generated by the engine 204, the further result generator 216 may generate a numeric analysis expression or mathematical expression to cause the engine 204 to generate the further result. In some embodiments and scenarios, generation of the numeric analysis expression or mathematical expression by the further result generator 216 may fail. For instance, in some scenarios the further result generator 216 may be unable to generate a numeric analysis expression or mathematical expression to perform the operation predicted by the user action predictor 212. For example, if the user action predictor 212 predicts that a user may wish to calculate a derivative of a set of numeric values, the further result generator 216 may determine that it is unable to generate a numeric analysis expression or mathematical expression to perform the predicted operation. Similarly, in some scenarios, the engine 204 may be unable to generate a result corresponding to the predicted operation. For example, if the user action predictor 212 predicts that a user may wish to perform a division operation, the engine 204 may determine that it is unable to generate the predicted operation because the division operation involves dividing a number or variable by zero.

In an embodiment, when the engine 204 is unable to perform an operation requested by the further result generator 216, the engine 204 may provide an indication to the further result generator 216 that the engine 204 was unable to perform the operation. In some embodiments, when the engine 204 is unable to perform a predicted operation requested by the further result generator 216 and/or when the further result generator 216 unable to generate a numeric analysis expression or mathematical expression to perform the predicted operation, the further result generator 216 may provide a failure indication to the user action predictor 212. The failure indication may include information that indicates what operation(s) failed and, optionally, why the failure(s) occurred, in some embodiments.

For explanatory purposes, a result generated in response to a user-provided or user-indicated numeric analysis expression or mathematical expression may sometimes be referred to herein as an "initial result," to differentiate from the further results generated by the further result generator 216 in response to the initial result.

As discussed above, the user action predictor 212 generates predictions of actions that the user may want to take based on or using the initial result. The user action predictor 212 may utilize information from the further result generator 216 to discard certain predictions, confirm certain predictions, etc., in some embodiments. For example, when the further result generator 216 determines that generation of a further result failed or generation of a numeric analysis expression or mathematical expression to generate the further result failed, the further result generator 216 may discard the corresponding prediction, in some embodiments. In some embodiments or scenarios, the user action predictor 212 does not utilize information from the further result generator 216. In some embodiments, the further result generator 216 may be omitted.

The user action predictor 212 provides indication(s) of predicted action(s) to a user interface generator 220, which generates a user interface to permit a user to select a predicted action to cause the predicted action to be implemented by the computational application 200 and/or to view a result of the predicted action that was already generated. The user interface may be a graphical user interface (GUI) such as a button, a pop-up menu, etc., and the computational application 200 may cause the GUI to be displayed on a display device, in some embodiments. The user may cause the predicted action to be implemented by the computational application 200 and/or view a result of the predicted action by, for example, selecting the button or an item in the menu with a mouse click, a touch screen press, etc.

In some embodiments, the user action predictor 212 is configured to utilize heuristics in generating the predictions of further user actions. For example, the user action predictor 212 may interact with the further result generator 216 to eliminate potential actions that would fail to produce valid results and/or that produce nonsensical results.

Additionally or alternatively, in some embodiments, the user action predictor 212 may utilize historical data 224 in generating the predictions. The historical data 224 may include information regarding previous actions such as information regarding actions requested by the user in response to different types of initial results, in an embodiment. Also, the information regarding previous actions may include information regarding previously predicted actions and whether and/or how often the user and/or other users chose to take the predicted actions, in an embodiment. For example, historical data may indicate that, when the initial result includes a polynomial, users typically request the computational application to find roots of the polynomial. Also, the information regarding previous actions may include information regarding subsequent actions taken by the user and/or other users in response to different types of results, in an embodiment. For example, historical data may indicate that, when the initial result includes a polynomial, the user often requests the computational application to factor the polynomial. On the other hand, for other users, historical data may indicate that, when the initial result includes a polynomial, the users often request the computational application to find roots of the polynomial.

In an embodiment, the user action predictor 212 may generate, for the same result, different predictions for different users based on the historical data for the different users. For example, because a first user frequently performs a factorization function when the result is a polynomial whereas a second user frequently performs a root-finding function when the result is a polynomial, the user action predictor 212 may generate, for the same polynomial result, a first set of one or more predictions including the factorization function for the first user, and a second set of one or more predictions including the root-finding function for the second user.

In an embodiment, the user action predictor 212 may generate, for the same result, different predictions for the same user at different times based on the historical data. For example, because the user initially performed a factorization function when the result was a polynomial but over time began to more frequently perform a root-finding function when the result was a polynomial, the user action predictor 212 may generate, for the same polynomial result, a first set of one or more predictions including the factorization function at an earlier time, and a second set of one or more predictions including the root-finding function at a subsequent time.

In an embodiment, the information regarding previous actions may include information regarding previous numeric analysis expressions or mathematical expressions chosen by the user to generate the initial result.

The user action predictor 212 may include or be coupled to a database of rules that indicate respective sets of possible actions to be taken in response to different types of results, different combinations of characteristics of the result, different combinations of result types and result characteristics, etc., in some embodiments. The user action predictor 212 may be configured to utilize the rules to determine a set of possible actions that a user may wish to perform on a result. In an embodiment, the user action predictor 212 may be configured to utilize the historical data 224 to order or prioritize a set of possible actions determined using the rules, to augment a set of possible actions determined using the rules, etc. In an embodiment, the user action predictor 212 may be configured to modify the rules over time based on the historical data 224.

In an embodiment, historical data 224 may comprise metrics corresponding to further actions taken by one or more users in response to different types of results, results having different combinations of characteristics, and/or combinations of result types and characteristic combinations. Utilization of historical data may include determining a probability or likelihood that a user will take a particular further action.

Referring to FIGS. 2 and 3, in an embodiment, the computational application 200 may be distributed across the user computer 154 and the server system 162. For example, in one embodiment, the computational application 200 may be implemented on the user computer 154 whereas at least a portion of the historical data 224 is stored at the server system 162. In this embodiment, the user computer 154 may communicate with the server system 162 to obtain historical data 224. As another example, the engine 204, the result analyzer 208, the user action predictor 212, the further result generator 216, and at least portion of the historical data 224 may be implemented on the server system 162, whereas the user interface generator 220 may be implemented on the user computer 154.

Figure 4A:
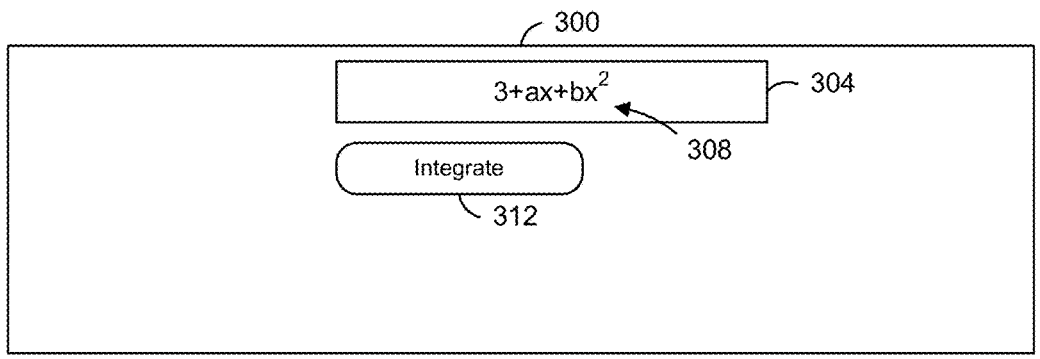
FIGS. 4A-4C are illustrations of an example display that is modified to include a user interface to facilitate performing a predicted further computational action or to facilitate viewing a result generated in response to the predicted further computational action.
Figure 4B:
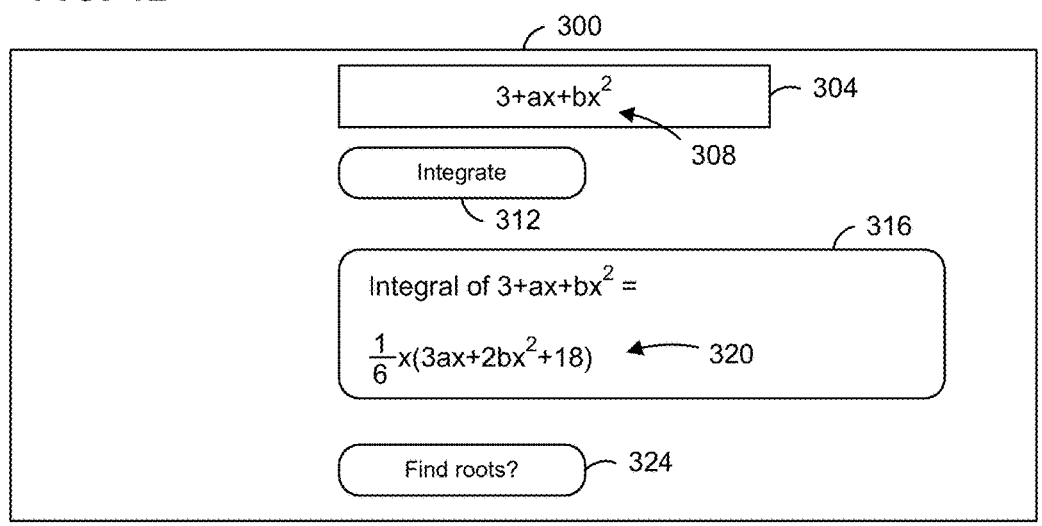
Figure 4C:
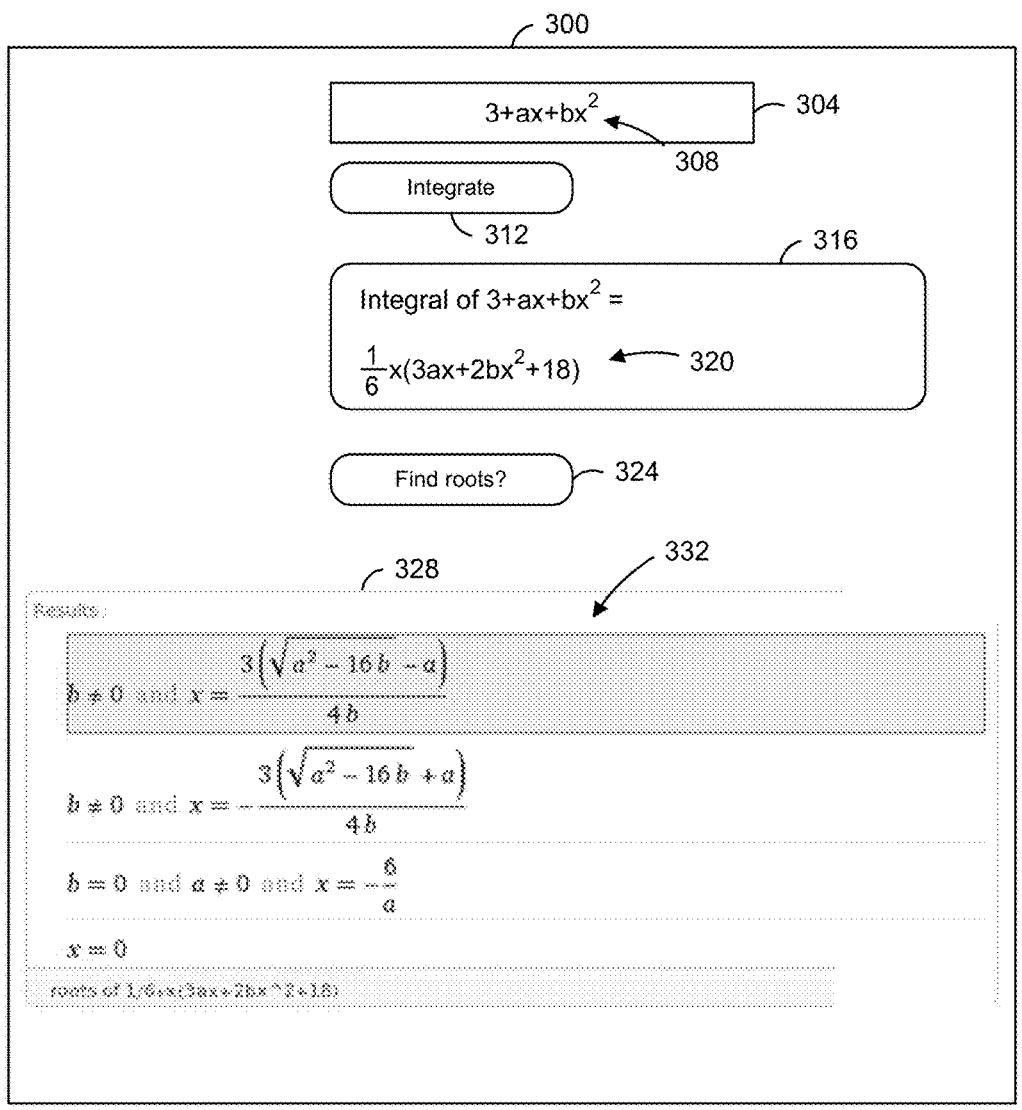

FIGS. 4A-4C are illustrations of an example display 300 for an integration calculator implemented by the computational application 200, according to an embodiment. The display 300 may be generated by the computational application 200 of FIG. 3 and displayed on a display device, and FIGS. 4A-4C will be described with reference to FIG. 3 for ease of explanation. In other embodiments, the display 300 may be generated using a different suitable application.

The display 300 includes a user interface mechanism 304 (e.g., an input box) in which a user may type a mathematical expression 308 to be integrated. Additionally, the display 300 includes a user interface mechanism 312 (e.g., a button) that the user may activate to cause the computational application 200 to calculate an integral of the mathematical expression 308 using the engine 204.

FIG. 4B is an illustration of the display 300 after the user has activated the button 312, according to an embodiment. The display 300 includes an area 316 in which to display a result 320. Additionally, the display 300 includes a user interface mechanism 324 (e.g., a button) that the user may activate to cause the computational application 200 (e.g., the engine 204) to calculate roots of the mathematical expression 320. In an embodiment, the result analyzer 208 analyzes the result 320 and determines that the result 320 is a polynomial, and the user action predictor 212 generates a prediction that the user may seek to determine roots of the polynomial. Then, the user action predictor 212 causes the user interface generator 220 to generate the user interface mechanism 324, in an embodiment.

FIG. 4C is an illustration of the display 300 after the user has activated the button 324, according to an embodiment. The display 300 includes an area 328 in which to display a further result 332. The computational application 200 calculates the further result using the engine 204.

Figure 5A:
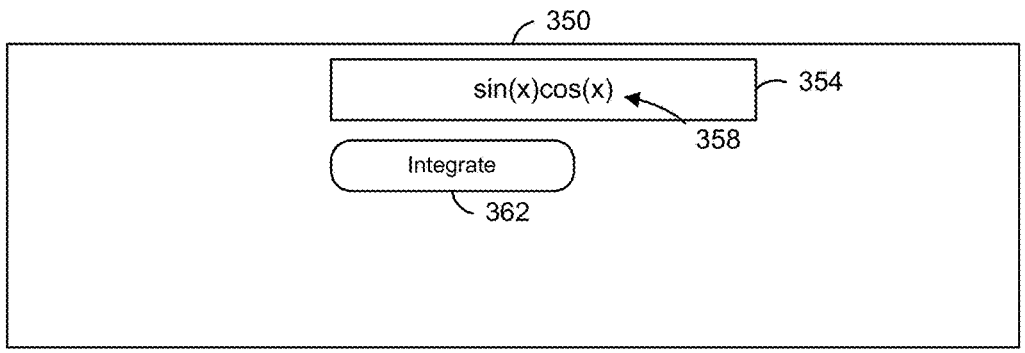
FIGS. 5A-5C are illustrations of another example display that is modified to include a user interface to facilitate performing a predicted further computational action or to facilitate viewing a result generated in response to the predicted further computational action.
Figure 5B:
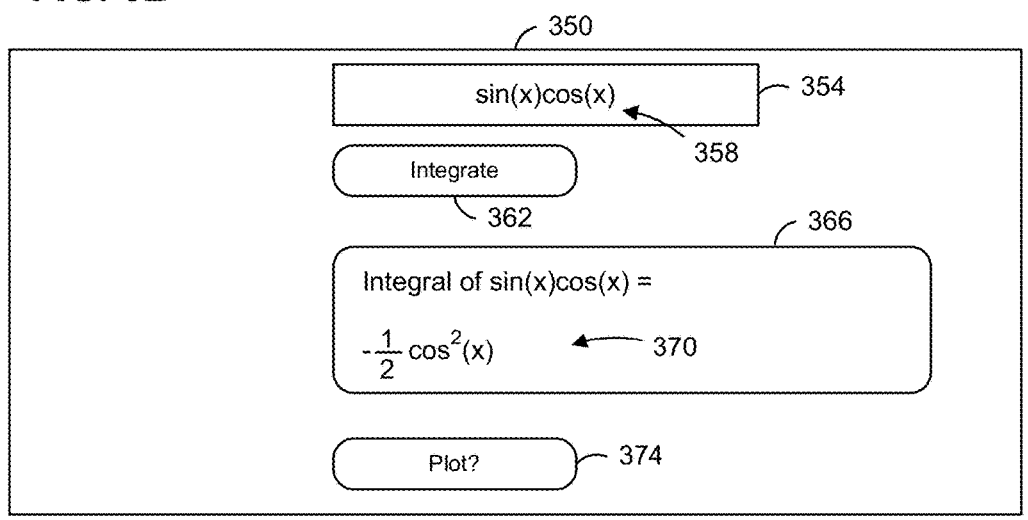
Figure 5C:
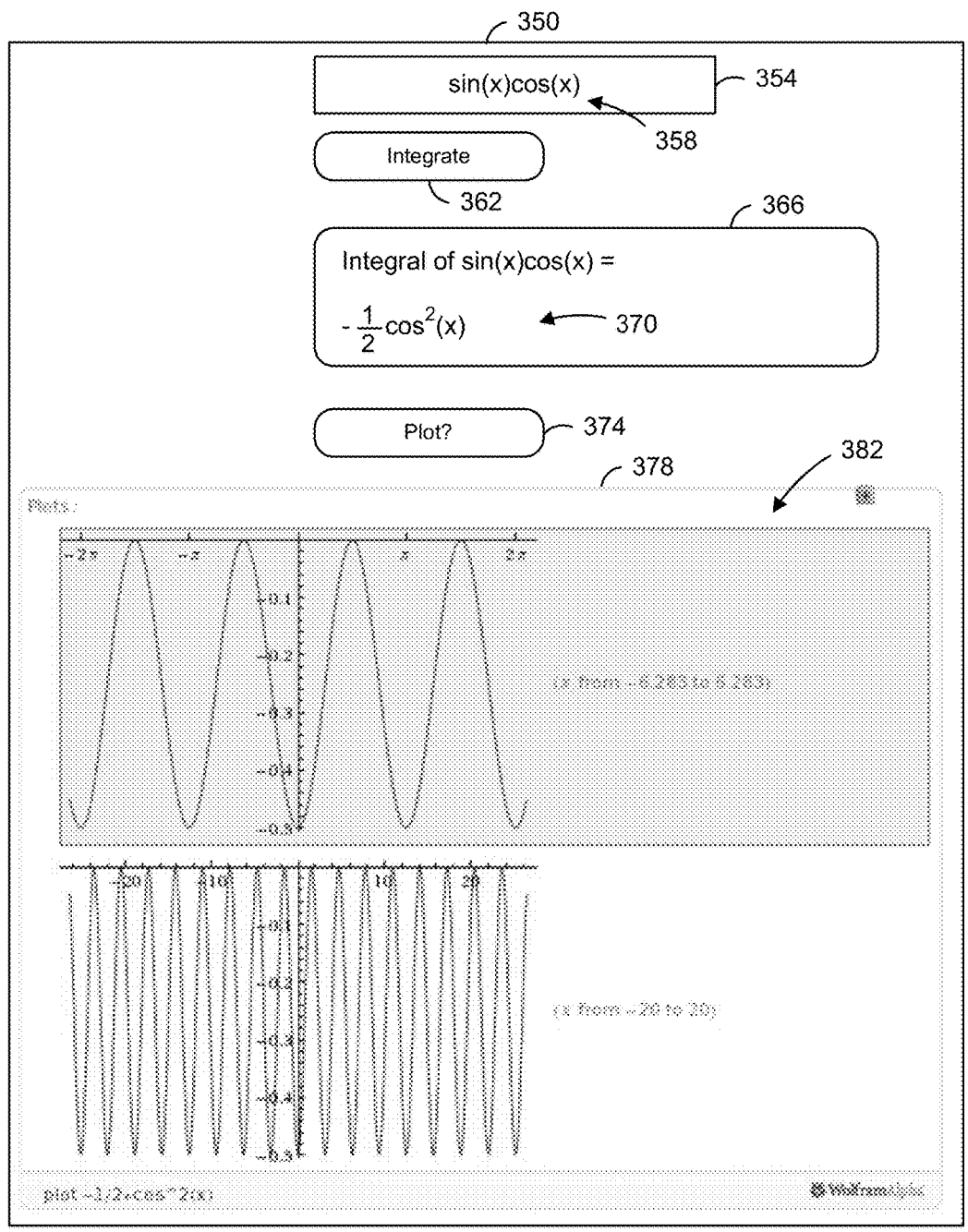

FIGS. 5A-5C are illustrations of an example display 350 for an integration calculator implemented by the computational application 200, according to an embodiment. The display 350 may be generated by the computational application 200 of FIG. 3 and displayed on a display device, and FIGS. 5A-5C will be described with reference to FIG. 3 for ease of explanation. In other embodiments, the display 350 may be generated using a different suitable application.

The display 350 includes a user interface mechanism 354 (e.g., an input box) in which a user may type a mathematical expression 358. Additionally, the display 350 includes a user interface mechanism 362 (e.g., a button) that the user may activate to cause the computational application 200 to calculate an integral of the mathematical expression 358 using the engine 204.

FIG. 5B is an illustration of the display 350 after the user has activated the button 362, according to an embodiment. The display 350 includes an area 366 in which to display a result 370. Additionally, the display 350 includes a user interface mechanism 374 (e.g., a button) that the user may activate to cause the computational application 200 (e.g., the engine 204) to determine a plot of the mathematical expression 370. In an embodiment, the result analyzer 208 analyzes the result 370 and determines that the result 370 is a trigonometric function, and the user action predictor 212 generates a prediction that the user may seek to determine a plot of the function 370. Then, the user action predictor 212 causes the user interface generator 220 to generate the user interface mechanism 374, in an embodiment.

FIG. 5C is an illustration of the display 350 after the user has activated the button 374, according to an embodiment. The display 350 includes an area 378 in which to display a further result 382. The computational application 200 calculates the further result using the engine 204.

Figure 6A:
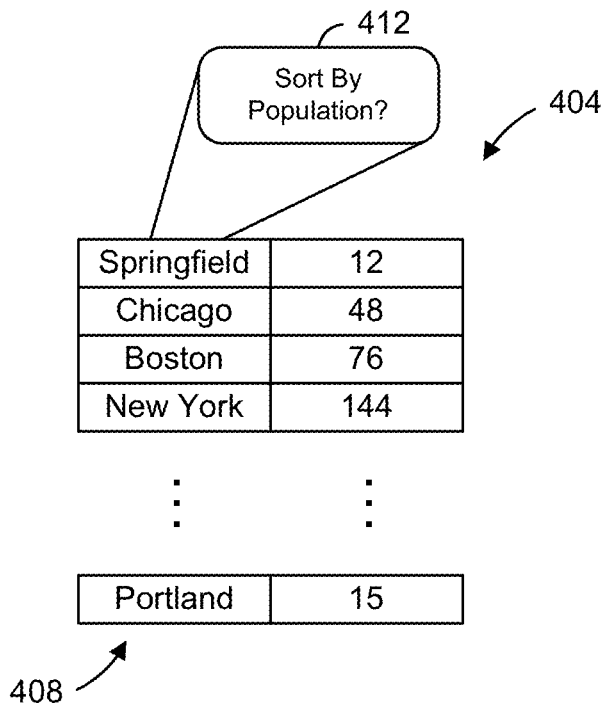
FIGS. 6A-6B are illustrations of other example displays that include a user interface to facilitate performing a predicted further computational action or to facilitate viewing a result generated in response to the predicted further computational action.
Figure 6B:
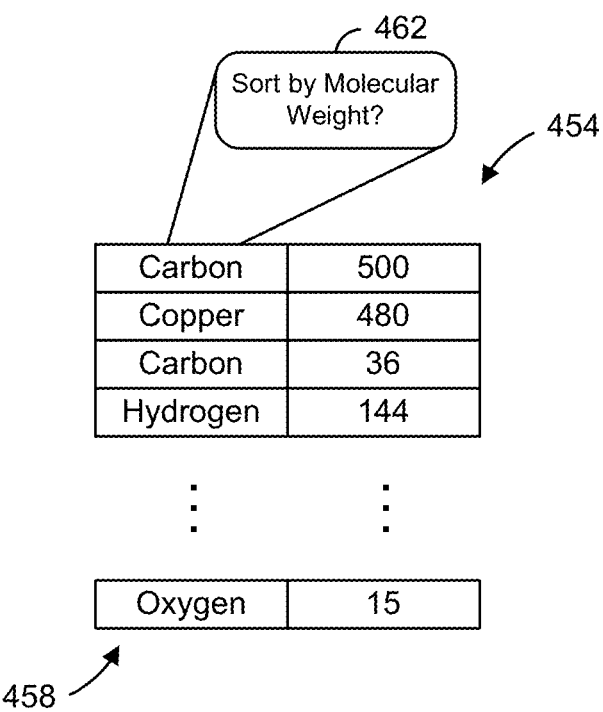

FIGS. 6A-6B are illustrations of an example displays for a computational application such as the computational application 200, according to an embodiment. The displays of FIGS. 6A-6B may be generated by the computational application 200 of FIG. 3 and displayed on a display device, and FIGS. 6A-6B will be described with reference to FIG. 3 for ease of explanation. In other embodiments, the displays of FIGS. 6A-6B may be generated using a different suitable application.

Referring to FIG. 6A, a display includes a table 404 that is an initial result generated by the engine 204 in response to a user input expression. The table 404 includes a column 408 with entries that correspond to cities. In an embodiment, the result analyzer 208 analyzes the result 404 and determines that the table 404 has a column 408 that includes cities. The user action predictor 212 generates a prediction that the user may seek to sort the table 404 based on the size of the cities. Then, the user action predictor 212 causes the user interface generator 220 to generate a user interface mechanism 412 to permit the user to cause the table 404 to be sorted according to the population sizes of the cities in the column 408, in an embodiment. In an embodiment, the computational application 200 may have access to population data for the cities which the computational application 200 uses to sort the table 404. The user interface mechanism 412 may be a pop-up tab within the table 404, an item in a pop-up menu, a separate button in the same display as the table 404, etc., for example.

Referring to FIG. 6B, a display includes a table 454 that is an initial result generated by the engine 204 in response to a user input expression. The table 454 includes a column 458 with entries that correspond to chemical elements. In an embodiment, the result analyzer 208 analyzes the result 454 and determines that the table 454 has a column 458 that includes chemical elements. The user action predictor 212 generates a prediction that the user may seek to sort the table 404 based on the molecular weights of the elements. Then, the user action predictor 212 causes the user interface generator 220 to generate a user interface mechanism 462 to permit the user to cause the table 454 to be sorted according to the molecular weights of the elements in the column 458, in an embodiment. In an embodiment, the computational application 200 may have access to molecular weight data for the elements which the computational application 200 uses to sort the table 454. The user interface mechanism 462 may be a pop-up tab within the table 454, an item in a pop-up menu, a separate button in the same display as the table 454, etc., for example.

In some embodiments, when a result of a predicted action is generated (e.g., utilizing the further result generator 216 (FIG. 3)) prior to displaying a user interface mechanism that corresponds to the predicted action, the user interface mechanism may be generated to include a visual indication of the result. For example, if a predicted action corresponds to generating a plot and the plot is generated (e.g., utilizing the further result generator 216 (FIG. 3)), the user interface mechanism may include a visual indication of the generated plot (e.g., a "thumbnail image" of the plot).

Although in the examples of FIGS. 4B, 5B, 6A and 6B, a user interface mechanism corresponding to a single action is shown, in other embodiments and/or scenarios, multiple user interface mechanisms corresponding to multiple predicted actions and/or a single user interface mechanism corresponding to multiple predicted actions may be utilized. For example, when multiple predicted actions are determined, multiple buttons may be displayed, each button corresponding to a different one of the predicted actions. As another example, when multiple predicted actions are determined, a pop-up or pull-down menu may be displayed, the menu having multiple menu items, each item corresponding to a different one of the predicted actions.

Figure 7:
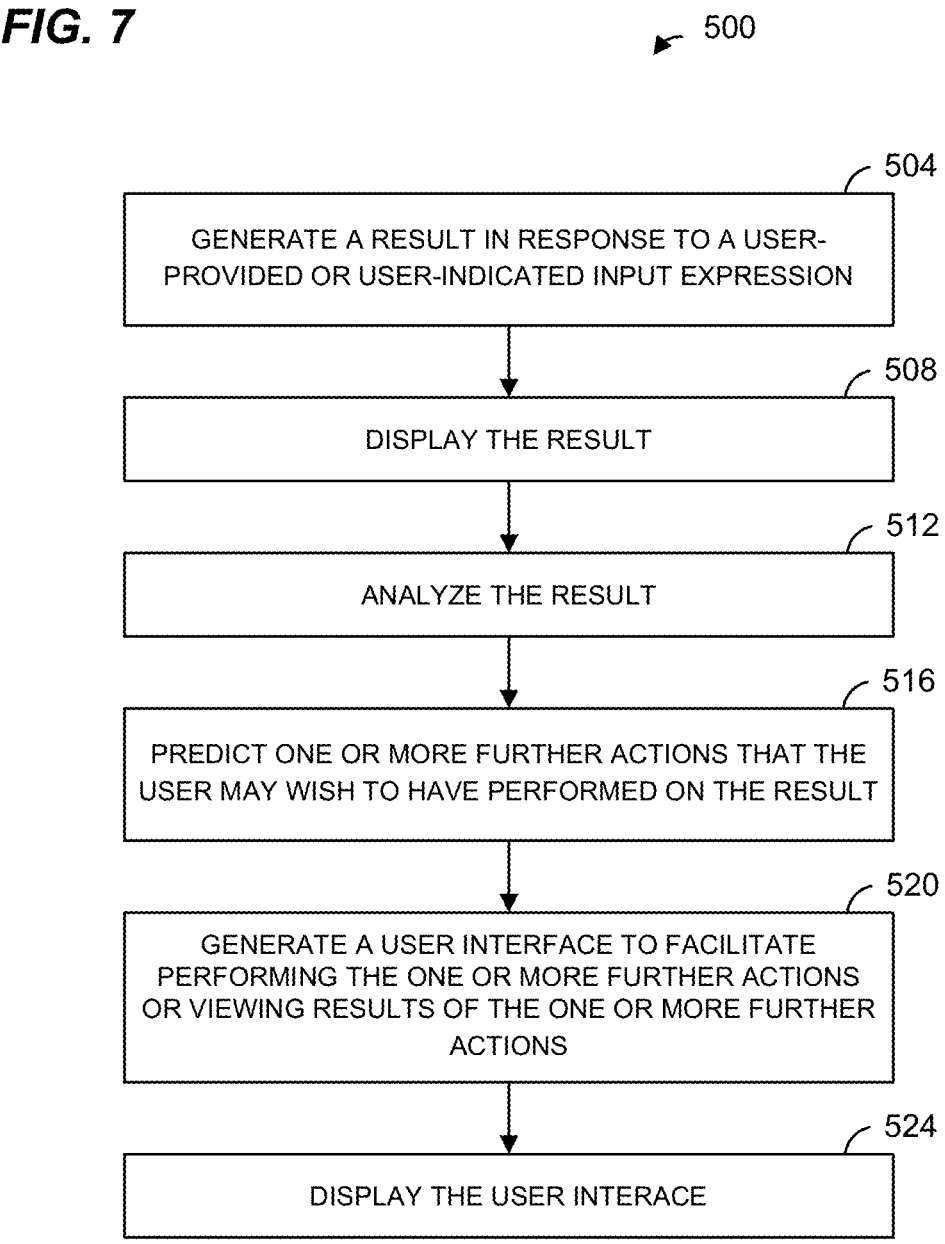
FIG. 7 is a flow diagram of an example method of generating a user interface based on an analysis of a result generated in response to a user-provided or user-indicated input expression, according to an embodiment.

FIG. 7 is a flow diagram of an example method 500 for generating a user interface. The method 500 may be implemented by a device such as the device 100 of FIG. 1, the user computer 154 and/or the server system 162 of FIG. 2, and/or by the computational application 200 of FIG. 3. The method 500 is described with reference to FIG. 3 for ease of explanation. In other embodiments, however, the method 500 is implemented by another suitable application.

At block 504, a result is generated using a computational system in response to a user-provided or user-indicated input expression. In an embodiment, the result is generated using the engine 204. At block 508, the result is displayed on a display device of a computer.

At block 512, the result is analyzed. In an embodiment, the result is analyzed using the result analyzer 208. In an embodiment, analyzing the result may comprise determine a type of the result. In another embodiment, analyzing the result may comprise determining one or more characteristics of the result. In an embodiment, analyzing the result may comprise determine a type of the result and determining one or more characteristics of the result.

At block 516, one or more further computational actions that the user will perform on the result are predicted based on the analysis of the result at block 512. In an embodiment, predicting one or more further computational actions includes generating a first set of one or more further computational actions based on the analysis at block 512, attempting to perform one or more of the actions in the first set, determining whether any attempt failed or if further results are invalid or nonsensical, and determining a second set of one or more further computational actions based on whether any attempt failed or if further results were invalid or nonsensical. For example, if it is determined that an action in the first set cannot be performed or that it produces an invalid or nonsensical result, the action may be omitted from the second set. On the other hand, if it is determined that an action in the first set can be performed and that it produces a valid result, the action may be included in the second set. In an embodiment, predicting one or more further computational actions includes generating a first set of one or more further computational actions, utilizing, determining whether any attempt failed or if further results are invalid or nonsensical, and determining a second set of one or more further computational actions based on whether any attempt failed or if further results were invalid or nonsensical.

In an embodiment, predicting one or more further computational actions includes utilizing historical data as described above. For example, in an embodiment, predicting one or more further computational actions includes generating a first set of one or more further computational actions based on the analysis at block 512, identifying additional further computational actions, if any, from based on the historical data, identifying computational actions in the first set to be omitted, if any, from based on the historical data, and determining a second set of one or more further computational actions based on identification of the additional further computational actions, if any, and identification of actions to be omitted, if any.

At block 520, a user interface mechanism is generated, wherein the user interface mechanism is for facilitating performing the predicted one or more computational actions or to facilitate viewing one or more further results generated in response to the one or more predicted further computational actions. In embodiments in which a second set of one or more further computational actions is determined as discussed above with respect to block 516, block 520 includes generating the user interface mechanism based on the second set. The user interface mechanism may be a suitable user interface mechanism such as one or more buttons, a pop-up menu, a pull-down menu, etc.

At block 524, the user interface mechanism is displayed on the display device. In an embodiment, the user interface mechanism is displayed automatically, i.e., without a user action specifically prompting display of the user interface mechanism. In another embodiment, the user interface mechanism is displayed in response to a user action such as a right-button mouse click, pressing of a key on a keyboard or keypad, pressing a button, etc.

When a user activates the user interface mechanism displayed at block 524, a further result is generated using the computational system. The blocks 508-524 may then be repeated based on the further result to generate a user interface mechanism to facilitate taking yet another predicted action, in an embodiment. This process may repeat several or many times, in an embodiment.

Figure 8:
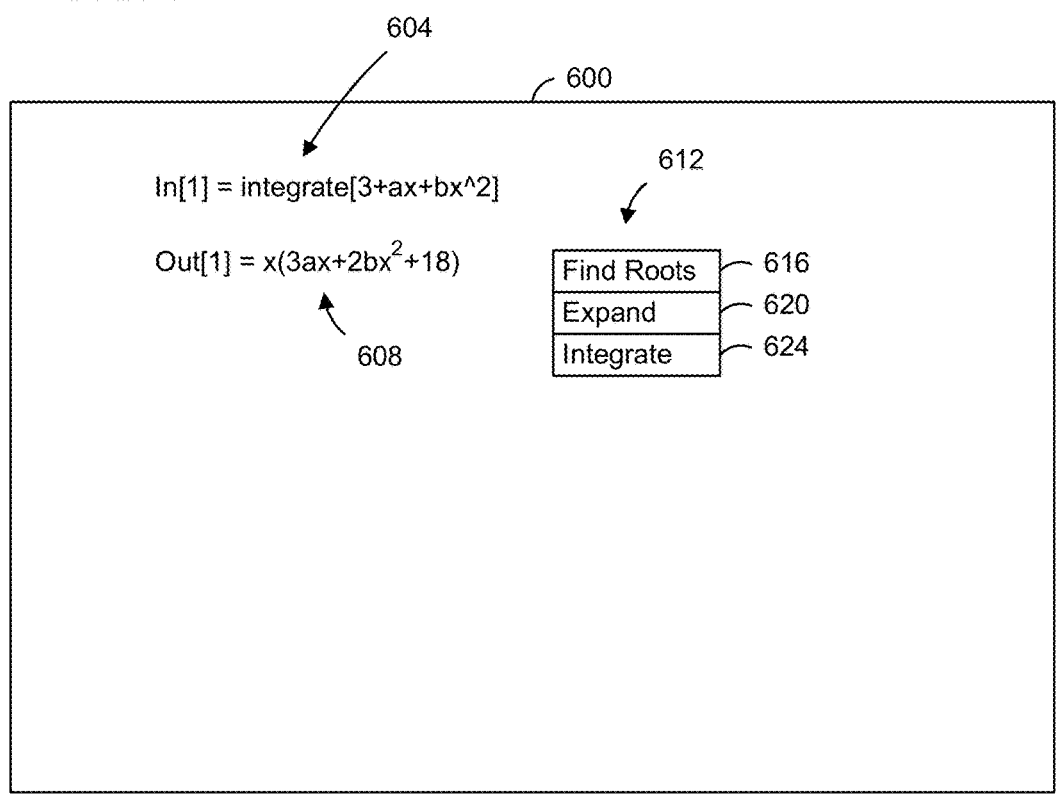
FIG. 8 is an illustration of an example electronic notebook that is modified to include a user interface to facilitate performing a predicted further computational action or to facilitate viewing a result generated in response to the predicted further computational action.

FIG. 8 is an illustration of an example notebook 600 for utilized in connection with the computational application 200, according to an embodiment. The notebook 600 may be generated by the computational application 200 of FIG. 3 and displayed on a display device, and FIG. 8 will be described with reference to FIG. 3 for ease of explanation. In other embodiments, the notebook 600 may be generated using a different suitable application.

The notebook 600 an expression 604 that was input by a user. The expression is a function that requests that a symbolic mathematical expression be integrated. When the user performs a suitable action, such as pressing the SHIFT-ENTER using a keyboard, the computational application 200 calculates an integral of the symbolic mathematical expression using the engine 204.

The notebook 600 displays a result 308 generated by the computational application 200. Additionally, the notebook 600 includes a user interface mechanism 612 (e.g., a menu) that includes a plurality of elements that the user may activate to cause the computational application 200 (e.g., the engine 204) to perform a corresponding further action. For example, the menu 612 includes a menu item 616 to cause the engine 204 to calculate roots of the mathematical expression 608. The menu 612 also includes a menu item 620 to cause the engine 204 to expand the mathematical expression 608 by, for example, multiplying each element within the parentheses of expression 608 by the "x" on the outside of the parentheses. The menu 612 also includes a menu item 624 to cause the engine 204 to calculate an integration of the expression 608.

In some embodiments, the user interface techniques described above can be implemented in a data processing system.

In some embodiments, a generated user interface mechanism need not be displayed on a display device. For example, the user interface mechanism may comprise audio prompts, and the user interface mechanism is rendered to the user using an audio output system (including a speaker or other suitable type of sound actuator) of a computer. Similarly, user input corresponding to activation of a user interface mechanism may be audio input received via an audio input system (including a microphone) of a computer.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A computer-implemented method, comprising:
receiving, at a data processing or computational system, a user input that specifies i) a first mathematical equation, and ii) a particular mathematical evaluation to be performed by the data processing or computational system;
generating, at the data processing or computational system, a first mathematical result of performing the specified mathematical evaluation on the first mathematical equation in response to receiving the user input, wherein the first mathematical result includes a second mathematical equation;
causing, at the data processing or computational system, a representation of the first mathematical result to be displayed on a display device, including causing the second mathematical equation to be displayed on the display device;
after generating the first mathematical result, analyzing, with the data processing or computational system, the first mathematical result, including determining one or more first mathematical characteristics of the second mathematical equation;
using the analysis of the first mathematical result, predicting, with the data processing or computational system, one or more first further mathematical analyses that the user will request be performed on the second mathematical equation and that are appropriate for the determined one or more first mathematical characteristics of the second mathematical equation, wherein predicting the one or more first further mathematical analysis includes:
 generating a first set of predicted mathematical analyses, and
 using heuristics to eliminate, from the first set of predicted mathematical analyses, analyses that will fail to produce valid results;
in response to predicting the one or more first further mathematical analyses and after generating the first mathematical result, generating, at the data processing or computational system, a first user interface mechanism (i) to cause performance of one or more of the predicted one or more first further mathematical analyses on the second mathematical equation, or (ii) to cause one or more first further mathematical results generated, by the data processing or computational system by performing one or more of the predicted one or more first further mathematical analyses on the second mathematical equation, to be displayed on the display device;
after the first mathematical result is displayed on the display device and in response to generating the first user interface mechanism, causing, at the data processing or computational system, the first user interface mechanism to be displayed on the display device;
in response to the user utilizing the first user interface mechanism and after the data processing or computational system performs one of the predicted one or more first further mathematical analyses on the first mathematical result to generate one second mathematical result, analyzing the second mathematical result, including determining one or more second mathematical characteristics of the second mathematical result;

using the analysis of the second mathematical result, predicting, with the data processing or computational system, one or more second further mathematical analyses that the user will request be performed on the second mathematical result and that are appropriate for the determined one or more second mathematical characteristics of the second mathematical result, wherein predicting the one or more second further mathematical analysis includes:
  generating a second set of predicted mathematical analyses, and
  using heuristics to eliminate, from the second set of predicted mathematical analyses, analyses that will fail to produce valid results;
in response to predicting the one or more second further mathematical analyses and after generating the second mathematical result, generating, at the data processing or computational system, a second user interface mechanism (i) to cause performance of one or more of the predicted one or more second further mathematical analyses on the mathematical result, or (ii) to cause one or more second further mathematical results generated, by the data processing or computational system by performing one or more of the predicted one or more second further mathematical analyses, to be displayed on the display device; and
after the second mathematical result is displayed on the display device and in response to generating the second user interface mechanism, causing the second user interface mechanism to be displayed on the display device.

2. The method of claim 1, wherein predicting the one or more first further mathematical analyses that the user will request be performed on the first mathematical result comprises:
  attempting, at the data processing or computational system, to compute a corresponding mathematical result for each predicted mathematical analysis in the first set; and
  wherein using heuristics to eliminate, from the first set of predicted mathematical analyses, analyses that will fail to produce valid results comprises:
  analyzing respective results of the attempts to compute the corresponding results for the first set of predicted mathematical analyses.

3. The method of claim 1, wherein predicting the one or more first further mathematical analyses that the user will request be performed on the first mathematical result further comprises analyzing historical data to identify past further mathematical analyses performed on mathematical equations having one or more mathematical characteristics the same as one or more of the one or more first mathematical characteristics of the second mathematical equation.

4. The method of claim 3, wherein analyzing the historical data comprises analyzing the historical data to identify past further mathematical analyses that the user chose to perform on the past mathematical equations having one or more mathematical characteristics the same as one or more of the one or more first mathematical characteristics of the second mathematical equation.

5. The method of claim 3, wherein analyzing the historical data comprises analyzing the historical data to identify past further mathematical analyses that at least one other user chose to perform on past mathematical equations having one or more mathematical characteristics the same as one or more of the one or more first mathematical characteristics of the second mathematical equation.

6. The method of claim 3, wherein analyzing the historical data comprises analyzing the historical data to identify past user-provided or user-indicated mathematical equations having one or more mathematical characteristics the same as one or more of the one or more first mathematical characteristics of the second mathematical equation.

7. The method of claim 1, further comprising:
  generating, at the data processing or computational system, a first further mathematical result corresponding to one of the predicted first further mathematical analyses;
  generating, at the data processing or computational system, a graphical depiction of the first further mathematical result; and
  generating, at the data processing or computational system, the first user interface mechanism to include the graphical depiction of the first further mathematical result.

8. An apparatus comprising:
one or more processors; and
one or memories coupled to the one or more processors, the one or more memories storing machine readable instructions that, when executed by the one or more processors, cause the one or more processors to:
  implement a data processing or computational system that is configured to generate mathematical results result of mathematically evaluating mathematical equations,
  receive a user input that specifies i) a first mathematical equation, and ii) a particular mathematical evaluation to be performed by the data processing or computational system,
  generate, with the data processing or computational system, a first mathematical result of performing the specified mathematical evaluation on the first mathematical equation in response to receiving the user input, wherein the first mathematical result includes a second mathematical equation,
  cause a representation of the first mathematical the result to be displayed on a display device, including causing the second mathematical equation to be displayed on the display device,
  after generating the first mathematical result, analyze the first mathematical result, including determining one or more first mathematical characteristics of the second mathematical equation,
  predict, using the analysis of the first mathematical result, one or more first further mathematical analyses that the user will request be performed on the second mathematical equation and that are appropriate for the determined one or more first mathematical characteristics of the second mathematical equation wherein predicting the one or more first further mathematical analysis includes:
    generating a first set of predicted mathematical analyses, and
    using heuristics to eliminate, from the first set of predicted mathematical analyses, analyses that will fail to produce valid results;
  wherein the one or more memories further store machine readable instructions that, when executed by the one or more processors, cause the one or more processors to:
    in response to predicting the one or more first further mathematical analyses and after generating the first mathematical result, generate a first user interface mechanism (i) to cause performance of one or more of the predicted one or more first further mathematical analyses on the second mathematical equation, or (ii) to cause one or more first further mathematical results generated, by the data processing or computational system, by performing one or more of the predicted one or more first further mathematical analyses on the second mathematical equation, to be displayed on the display device, after the first mathematical result is displayed on the display device and in response to generating the first user interface mechanism, cause the first user interface mechanism to be displayed on the display device, in response to the user utilizing the first user interface mechanism and after the data processing or computational system performs one of the predicted one or more first further mathematical analyses on the first mathematical result to generate one second mathematical result, analyze the second mathematical result, including determining one or more second mathematical characteristics of the second mathematical result, using the analysis of the second mathematical result, predict one or more second further mathematical analyses that the user will request be performed on the second mathematical result and that are appropriate for the determined one or more second mathematical characteristics of the second mathematical result wherein predicting the one or more second further mathematical analysis includes:

generating a second set of predicted mathematical analyses, and using heuristics to eliminate, from the second set of predicted mathematical analyses, analyses that will fail to produce valid results;

wherein the one or more memories further store machine readable instructions that, when executed by the one or more processors, cause the one or more processors to:

in response to predicting the one or more second further mathematical analyses and after generating the second mathematical result, generate a second user interface mechanism (i) to cause performance of one or more of the predicted one or more second further mathematical analyses on the mathematical result, or (ii) to cause one or more second further mathematical results generated, by the data processing or computational system by performing one or more of the predicted one or more second further mathematical analyses, to be displayed on the display device, and after the second mathematical result is displayed on the display device and in response to generating the second user interface mechanism, cause the second user interface mechanism to be displayed on the display device.

9. The apparatus of claim 8, wherein the one or memories store machine readable instructions that, when executed by the one or more processors, cause the one or more processors are further configured to:

attempt to compute a corresponding result for each predicted mathematical analysis in the first set; and wherein using heuristics to eliminate, from the first set of predicted mathematical analyses, analyses that will fail to produce valid results comprises:

analyzing respective results of the attempts to compute the corresponding results for the first set of predicted mathematical analyses.

10. The apparatus of claim 8, wherein the one or memories store machine readable instructions that, when executed by the one or more processors, cause the one or more processors to predict the one or more first further mathematical analyses that the user will request be performed on the first mathematical result further by analyzing historical data to identify past further mathematical analyses performed on mathematical equations having one or more mathematical characteristics the same as one or more of the one or more first mathematical characteristics of the second mathematical equation.

11. The apparatus of claim 8, wherein the one or memories store machine readable instructions that, when executed by the one or more processors, cause the one or more processors to:

generate a first further mathematical result corresponding to one of the predicted first further mathematical analyses;

generate a graphical depiction of the first further mathematical result; and generate the first user interface mechanism to include the graphical depiction of the first further mathematical result.

12. A computer-readable memory storing machine readable instructions that, when executed by one or more processors, cause the one or more processors to:

implement a data processing or computational system that is configured to generate mathematical results of mathematically evaluating mathematical equations;

receive a user input that specifies i) a first mathematical equation, and ii) a particular mathematical evaluation to be performed by the data processing or computational system;

generate, with the data processing or computational system, a first mathematical result of performing the specified mathematical evaluation on the first mathematical equation in response to receiving the user input, wherein the first mathematical result includes a second mathematical equation;

cause a representation of the first mathematical the result to be displayed on a display device, including causing the second mathematical equation to be displayed on the display device;

after generating the first mathematical result, analyze the first mathematical result, including determining one or more first mathematical characteristics of the second mathematical equation;

predict, using the analysis of the first mathematical result, one or more first further mathematical analyses that the user will request be performed on the second mathematical equation and that are appropriate for the determined one or more first mathematical characteristics of the second mathematical equation, wherein predicting the one or more first further mathematical analysis includes:

generating a first set of predicted mathematical analyses, and using heuristics to eliminate, from the first set of predicted mathematical analyses, analyses that will fail to produce valid results;

in response to predicting the one or more first further mathematical analyses and after generating the first mathematical result, generate a first user interface mechanism (i) to cause performance of one or more of the predicted one or more first further mathematical analyses on the second mathematical equation, or (ii) to cause one or more first further mathematical results generated, by the data processing or computational system, by performing one or more of the predicted one or more first further mathematical analyses on the second mathematical equation, to be displayed on the display device;

after the first mathematical result is displayed on the display device and in response to generating the first user interface mechanism, cause the first user interface mechanism to be displayed on the display device;

in response to the user utilizing the first user interface mechanism and after the data processing or computational system performs one of the predicted one or more first further mathematical analyses on the first mathematical result to generate one second mathematical result, analyze the second mathematical result, including determining one or more second mathematical characteristics of the second mathematical result;

using the analysis of the second mathematical result, predict one or more second further mathematical analyses that the user will request be performed on the second mathematical result and that are appropriate for the determined one or more second mathematical characteristics of the second mathematical result, wherein predicting the one or more second further mathematical analysis includes:
  generating a second set of predicted mathematical analyses, and
  using heuristics to eliminate, from the second set of predicted mathematical analyses, analyses that will fail to produce valid results;

in response to predicting the one or more second further mathematical analyses and after generating the second mathematical result, generate a second user interface mechanism (i) to cause performance of one or more of the predicted one or more second further mathematical analyses on the mathematical result, or (ii) to cause one or more second further mathematical results generated, by the data processing or computational system by performing one or more of the predicted one or more second further mathematical analyses, to be displayed on the display device; and after the second mathematical result is displayed on the display device and in response to generating the second user interface mechanism, cause the second user interface mechanism to be displayed on the display device.

13. The computer-readable memory of claim 12, wherein the machine readable instructions, when executed by one or more processors, cause the one or more processors to:
  wherein using heuristics to eliminate, from the first set of predicted mathematical analyses, analyses that will fail to produce valid results comprises:
  attempt to compute a corresponding result for each predicted mathematical analysis in the first set; and
  analyzing respective results of the attempts to compute the corresponding results for the first set of predicted mathematical analyses.

14. The computer-readable memory of claim 12, wherein the machine readable instructions, when executed by one or more processors, cause the one or more processors to predict the one or more first further mathematical analyses that the user will request be performed on the first mathematical result further by analyzing historical data to identify past further mathematical analyses performed on mathematical equations having one or more mathematical characteristics the same as one or more of the one or more first mathematical characteristics of the second mathematical equation.

15. The computer-readable memory of claim 12, wherein the machine readable instructions, when executed by one or more processors, cause the one or more processors to:
  generate a first further mathematical result corresponding to one of the predicted first further mathematical analyses;
  generate a graphical depiction of the first further mathematical result; and
  generate the first user interface mechanism to include the graphical depiction of the first further mathematical result.

* * * * *